(12) United States Patent
Liu

(10) Patent No.: US 8,269,723 B2
(45) Date of Patent: Sep. 18, 2012

(54) COMPUTER MOUSE WITH VIRTUAL KEYS

(75) Inventor: Yung-Lung Liu, Taichung Hsien (TW)

(73) Assignee: Sunrex Technology Corp., Taichung (TW)

( * ) Notice: Subject to any disclaimer, the term of this patent is extended or adjusted under 35 U.S.C. 154(b) by 297 days.

(21) Appl. No.: 12/652,959

(22) Filed: Jan. 6, 2010

(65) Prior Publication Data
US 2011/0163959 A1 Jul. 7, 2011

(51) Int. Cl.
*G06F 3/033* (2006.01)
(52) U.S. Cl. .................. 345/166; 345/163
(58) Field of Classification Search .......... 345/163, 345/164, 165, 166
See application file for complete search history.

(56) References Cited

U.S. PATENT DOCUMENTS

| | | | | |
|---|---|---|---|---|
| 4,514,726 A * | 4/1985 | Whetstone et al. | | 345/163 |
| 6,927,758 B1 * | 8/2005 | Piot et al. | | 345/166 |
| 7,808,479 B1 * | 10/2010 | Hotelling et al. | | 345/163 |
| 2004/0129787 A1 * | 7/2004 | Saito et al. | | 235/492 |
| 2007/0296701 A1 * | 12/2007 | Pope et al. | | 345/168 |
| 2008/0174553 A1 * | 7/2008 | Trust | | 345/163 |

* cited by examiner

*Primary Examiner* — Quan-Zhen Wang
*Assistant Examiner* — David Lee

(57) ABSTRACT

A computer mouse in one embodiment includes an arcuate cover comprising a plurality of projections on a top surface; a capacitance trigger assembly aligned with the projections thereabove and comprising a flexible arcuate first capacitive film and a flexible arcuate second capacitive film therebelow; a printed circuit board disposed under the capacitance trigger assembly and comprising a photodetector array on an underside and a microprocessor; and a base releasably secured to the cover and comprising a light guide. In response to a touch of the projection, a button clicking action is triggered.

2 Claims, 5 Drawing Sheets

COMPUTER MOUSE WITH VIRTUAL KEYS

BACKGROUND OF THE INVENTION

1. Field of Invention

The invention relates to computer mice and more particularly to a computer mouse having a flexible capacitance trigger assembly and virtual keys aligned with the capacitance trigger assembly such that operating the mouse by pressing may have the effects of conventional mouse button clicking, scroll wheel scrolling, or conventional keyboard key-in or function keys.

2. Description of Related Art

Computer mice are well known peripherals for personal computers. A computer mouse is a pointing device held under the hand and functions by detecting two-dimensional motions of the pointing device relative to its supporting surface. The mouse's motion translates into a motion of a pointer (i.e., cursor) on a display of the computer.

Conventionally, a mechanical or opto-mechanical computer mouse has rollers and one, two, or even more buttons. Still conventionally, the computer mouse has a scroll wheel projecting out of its top cover.

However, so far as the inventor is aware, no virtual keys having characters or functions keys printed thereon are provided in any type of computer mouse. Moreover, no small projections for guiding purposes are provided on a top cover of any type of computer mouse. Hence, users may have difficulties of manipulating a computer mouse in a dark environment. Thus, the need for improvement still exists.

SUMMARY OF THE INVENTION

It is therefore one object of the invention to provide a computer mouse having a flexible capacitance trigger assembly and virtual keys aligned with the capacitance trigger assembly such that operating the mouse by pressing may have the effects of conventional mouse button clicking, scroll wheel scrolling, or conventional keyboard key-in or function keys.

In one aspect of the invention, there is provided a computer mouse comprising an arcuate cover comprising a plurality of projections on a top surface; a capacitance trigger assembly aligned with the projections thereabove and comprising a flexible arcuate first capacitive film and a flexible arcuate second capacitive film therebelow; a printed circuit board disposed under the capacitance trigger assembly and comprising photodetector means on an underside and a microprocessor; and a base releasably secured to the cover and comprising light guide means, wherein in response to a touch of the projection, a button clicking action is triggered.

In another aspect of the invention, there is provided a computer mouse comprising an arcuate cover comprising a plurality of virtual keys on a top surface; a capacitance trigger assembly aligned with the virtual keys thereabove and comprising a flexible arcuate first capacitive film and a flexible arcuate second capacitive film therebelow; a printed circuit board disposed under the capacitance trigger assembly and comprising photodetector means on an underside and a microprocessor; and a base releasably secured to the cover and comprising light guide means, wherein the virtual keys comprises a plurality of characters and a plurality of function keys printed thereon; and wherein in response to a touch of the virtual key, a key pressing action is triggered.

The above and other objects, features and advantages of the invention will become apparent from the following detailed description taken with the accompanying drawings.

DETAILED DESCRIPTION OF THE INVENTION

Figure 1:
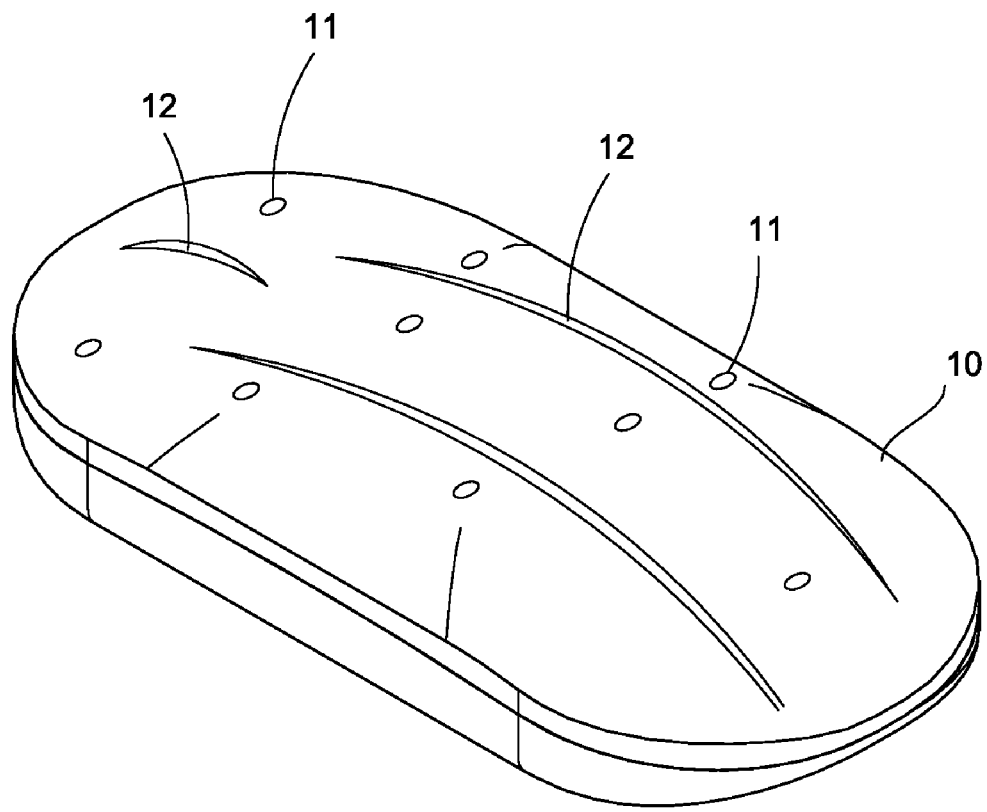
FIG. 1 is a perspective view of a first preferred embodiment of computer mouse according to the invention.
Figure 2:
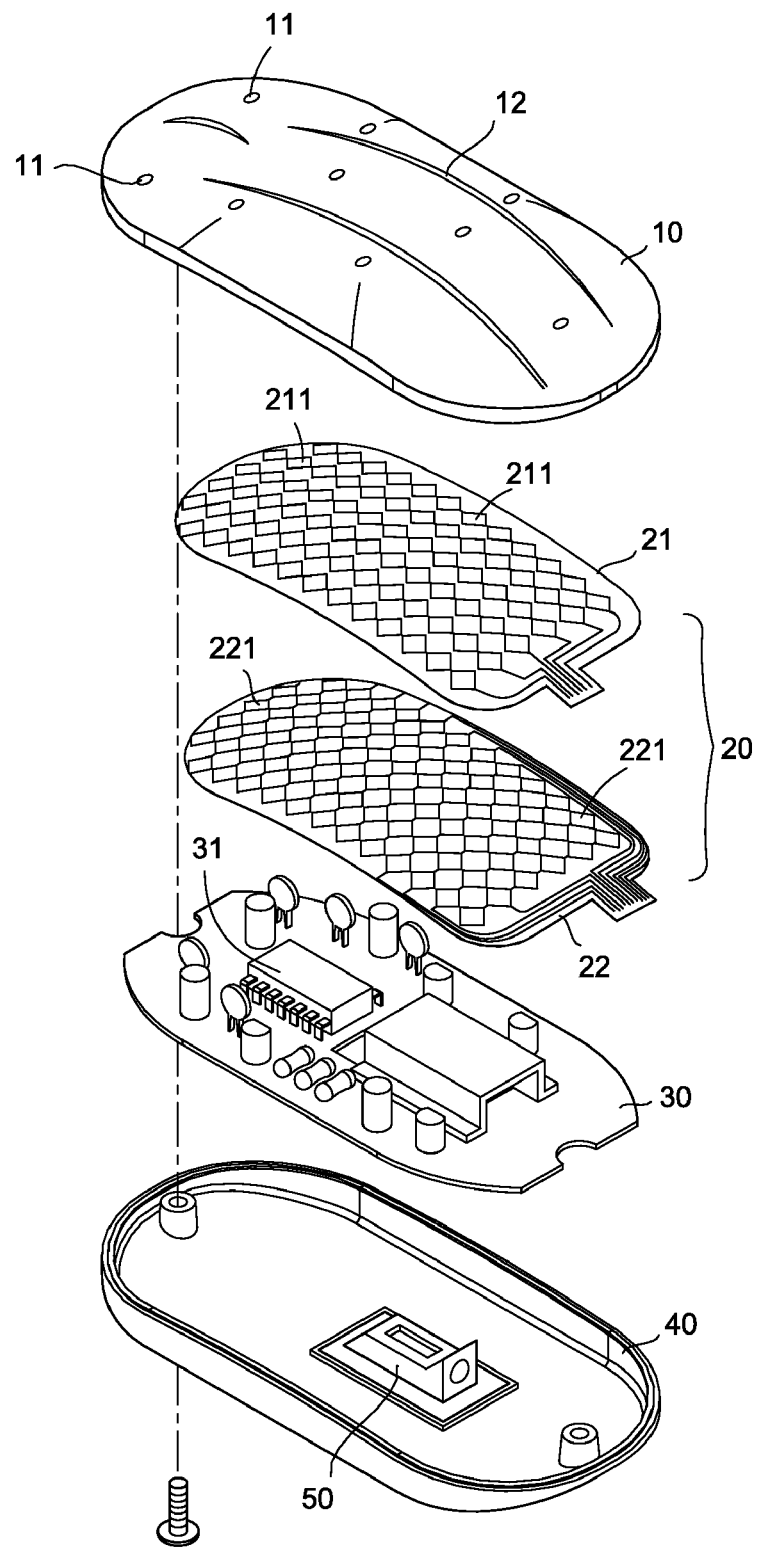
FIG. 2 is an exploded view of the computer mouse.
Figure 3:
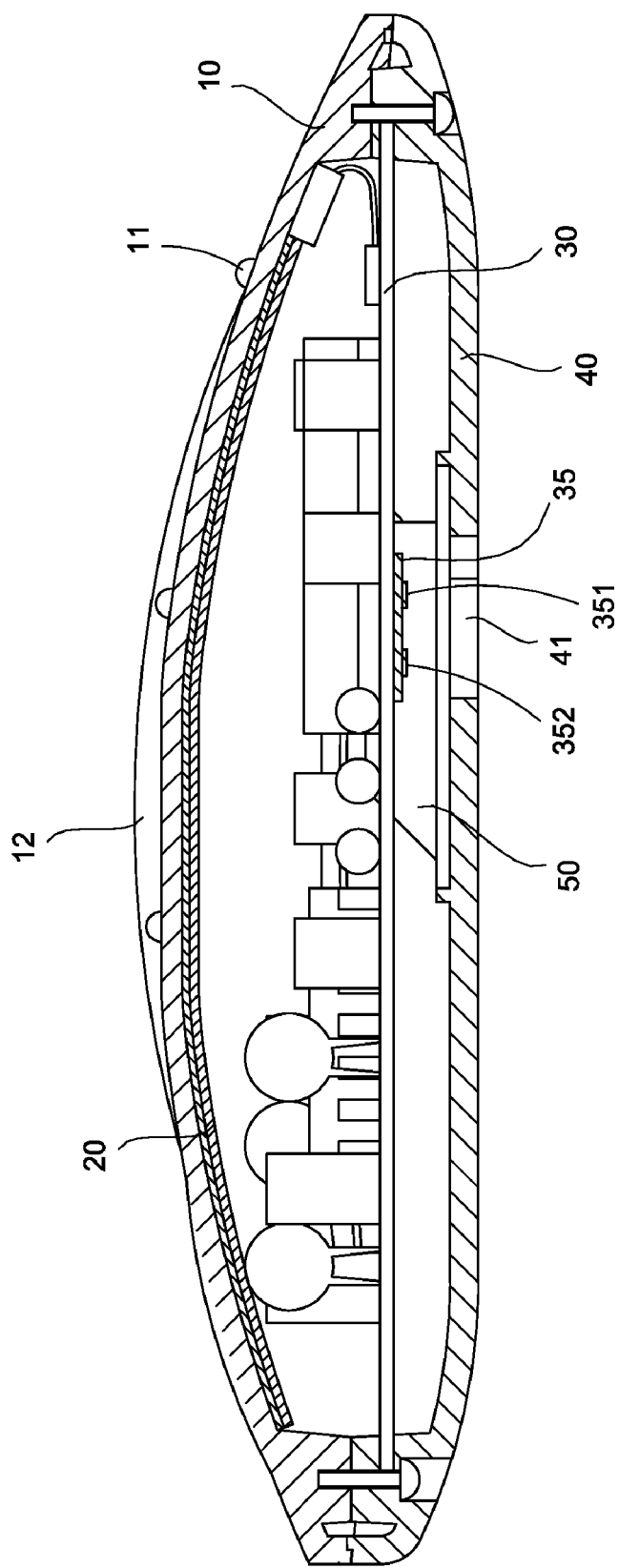
FIG. 3 is a longitudinal sectional view of the computer mouse of FIG. 1.

Referring to FIGS. 1 to 3, a computer mouse in accordance with a first preferred embodiment of the invention comprises the following components as discussed in detail below.

An arcuate top cover 10 has an ergonomic surface. A plurality of small projections 11 and a plurality of ribs 12 are formed on the cover 10. The projections 11 have oblique lines or curves formed thereon so that the projections 11 may form a pattern for guiding purposes. A touch of the projection 11 by the finger can trigger an action similar to that of a typical computer mouse button clicking.

A capacitance trigger assembly 20 comprises a first capacitive film 21 and a second capacitive film 22 therebelow. Each of the first and second capacitive films 21, 22 is flexible in nature and is convex. The capacitance trigger assembly 20 is provided to urge against the underside of the cover 10. The first capacitive film 21 has a plurality of rows of a plurality of sensors 211. Also, the second capacitive film 22 has a plurality of rows of a plurality of sensors 221. The sensors 221 are aligned with the upper sensors 211 which are in turn aligned with the projections 11. Thus, a touch of the projection 11 by the finger can change a capacitance of the capacitance trigger assembly 20 (i.e., capacitance of each of the first and second capacitive films 21, 22). This, as envisaged by the invention, has the effect of functioning as typical computer mouse button clicking or scroll wheel scrolling.

A printed circuit board (PCB) 30 is provided under the capacitance trigger assembly 20 and comprises a microprocessor 31 and related driver circuitry (not shown). The PCB 30 further comprises a photodetector array 35 on its underside. The photodetector array 35 comprises a light source (e.g., LED (light-emitting diode)) 351 for emitting diffuse light, and a photosensor 352.

A base 40 is threadedly secured to the cover 10. An aperture housing 50 is mounted on a top surface of the base 40 and functions as a typical means for guiding light. An opening 41 is provided on the base 40 and is aligned with the aperture housing 50 thereabove. Diffuse light emitted by the light source 351 impinges onto a supporting surface through the aperture housing 50 and the opening 41. The light is then reflected by the supporting surface to reach the photosensor 352 through the opening 41 and the aperture housing 50. In response to the light impinging thereon, the photosensor 352 creates an output. In response to the output from the photosensor 352, the photodetector array 35 generates a cursor control output which is in turn translated into a motion of a cursor on a display of a computer by the microprocessor of the PCB 30.

Figure 4:
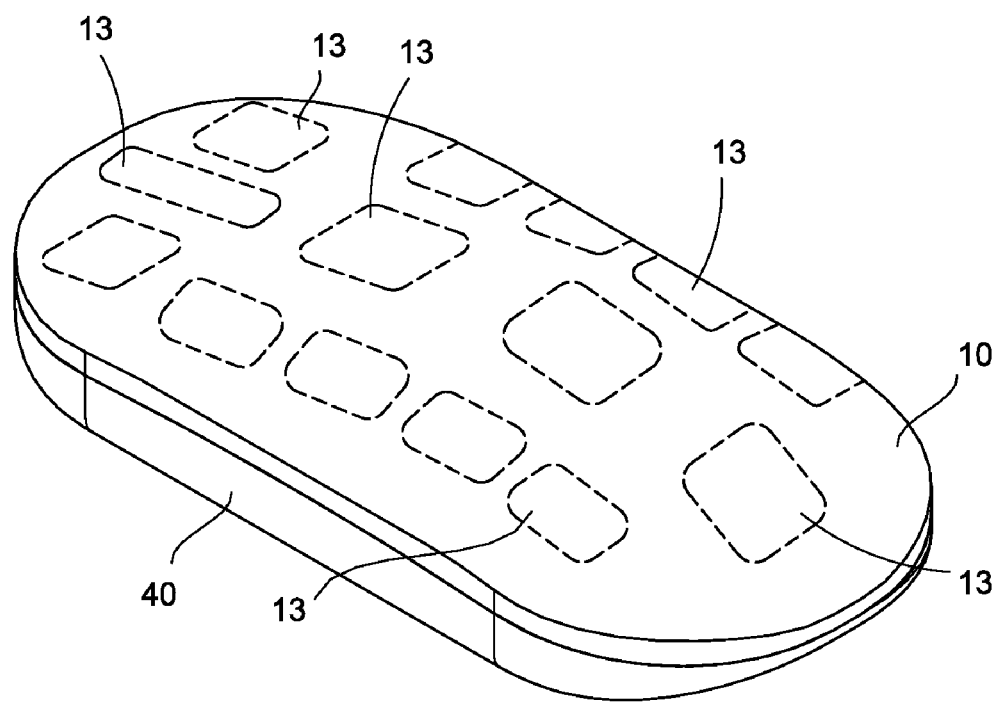
FIG. 4 is a perspective view of a second preferred embodiment of computer mouse according to the invention.
Figure 5:
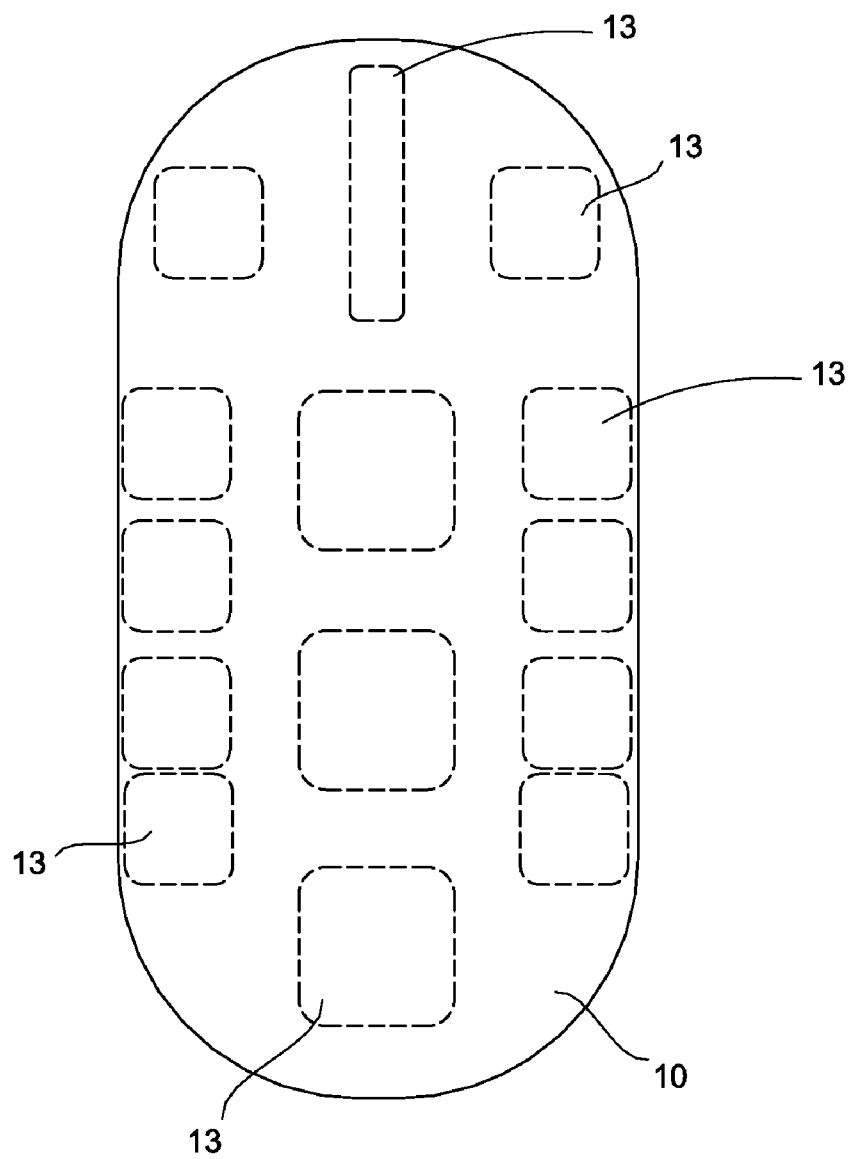
FIG. 5 is a top plan view of the computer mouse of FIG. 4.

Referring to FIGS. 4 and 5, a computer mouse in accordance with a second preferred embodiment of the invention is shown. The characteristics of the second preferred embodiment are detailed below. The plurality of small projections 11 and the plurality of ribs 12 are eliminated. A plurality of rectangular virtual keys 13 with printed characters and function keys are provided on a top surface of the cover 10. The virtual keys 13 are aligned with the sensors 211 therebelow. And the sensors 211 are in turn aligned with the sensors 221 therebelow. Thus, the computer mouse of the invention can operate as a typical computer keyboard.

Moreover, the virtual keys 13 and/or the characters and function keys printed thereon are formed of an optical transmissive material. Also, the capacitance trigger assembly 20 is formed of an optical transmissive material. Hence, a user may easily operate the computer mouse in a dark environment because light emitted by the light source of the mouse can be directed to the virtual keys 13 through the capacitance trigger assembly 20 for illumination in backlight.

In brief, features of a typical mouse and numeral keys and function keys of a typical keyboard are incorporated into the computer mouse of the invention. The invention further has the following advantages. The arcuate top cover is ergonomic. It can function as typical computer mouse button clicking or scroll wheel scrolling. A plurality of rectangular virtual keys with printed characters and function keys are provided on the top cover to be used as indication means such that pressing the virtual keys may have the effects of conventional keyboard key-in or function keys. A photodetector array is provided on an underside of a PCB for generating a cursor control output. Ribs and small projections are formed on the top cover as touch guide. Backlight is provided to help people operate the computer mouse in a dark environment. Further, the backlight arrangement can assist people (e.g., senior citizens or people having poor eyesight) to operate the computer mouse in a dark environment.

While the invention herein disclosed has been described by means of specific embodiments, numerous modifications and variations could be made thereto by those skilled in the art without departing from the scope and spirit of the invention set forth in the claims.

What is claimed is:

1. A computer mouse comprising:
   an arcuate cover comprising a plurality of projections on a top surface;
   a capacitance trigger assembly aligned with the projections thereabove and comprising a flexible arcuate first capacitive film and a flexible arcuate second capacitive film therebelow;
   a printed circuit board disposed under the capacitance trigger assembly and comprising photodetector means on an underside and a microprocessor; and
   a base releasably secured to the cover and comprising light guide means,
   wherein in response to a touch of the projection, a button clicking action is triggered;
   wherein the projections have a plurality of oblique lines or curves to form a guiding pattern; and
   wherein the first capacitive film comprises a plurality of rows of a plurality of first sensors and the second capacitive film comprises a plurality of rows of a plurality of second sensors, wherein the second sensors are aligned with the first upper sensors which are aligned with the projections, and wherein in response to touching the projection, a capacitance of the capacitance trigger assembly is changed to trigger the button clicking action.

2. A computer mouse comprising:
   an arcuate cover comprising a plurality of virtual keys on a top surface;
   a capacitance trigger assembly aligned with the virtual keys thereabove and comprising a flexible arcuate first capacitive film and a flexible arcuate second capacitive film therebelow;
   a printed circuit board disposed under the capacitance trigger assembly and comprising photodetector means on an underside and a microprocessor; and
   a base releasably secured to the cover and comprising light guide means,
   wherein the virtual keys comprises a plurality of characters and a plurality of function keys printed thereon;
   wherein in response to a touch of the virtual key, a key pressing action is triggered;
   wherein the virtual keys are formed of an optical transmissive material and the capacitance trigger assembly is formed of an optical transmissive material;
   wherein the characters and the function keys are formed of an optical transmissive material and the capacitance trigger assembly is formed of an optical transmissive material;
   wherein the first capacitive film comprises a plurality of rows of a plurality of first sensors and the second capacitive film comprises a plurality of rows of a plurality of second sensors, wherein the second sensors are aligned with the first upper sensors which are aligned with the virtual keys, and wherein in response to touching the virtual key, a capacitance of the capacitance trigger assembly is changed to trigger the key pressing action; and
   wherein the characters and the function keys are aligned with the first and second sensors therebelow.

* * * * *